Feb. 6, 1940.  R. DAUB  2,189,600
CRANKCASE
Filed May 27, 1937
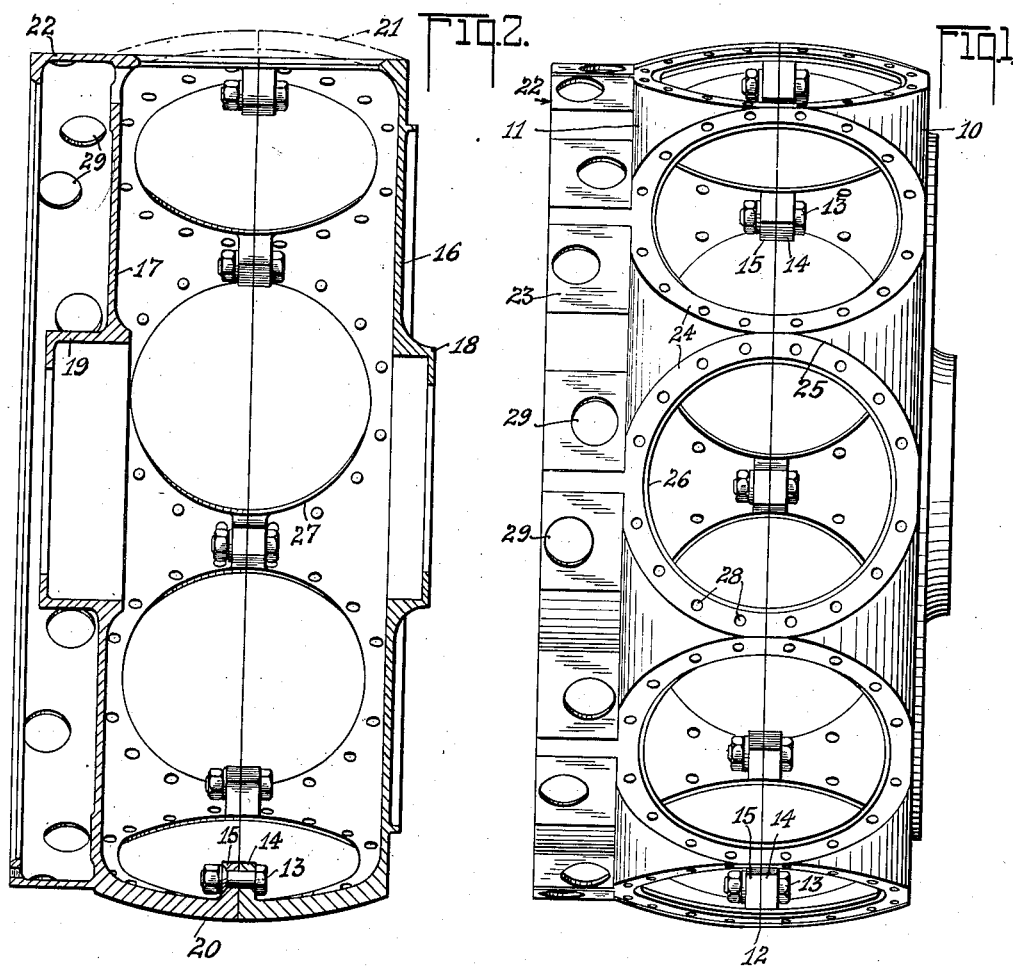
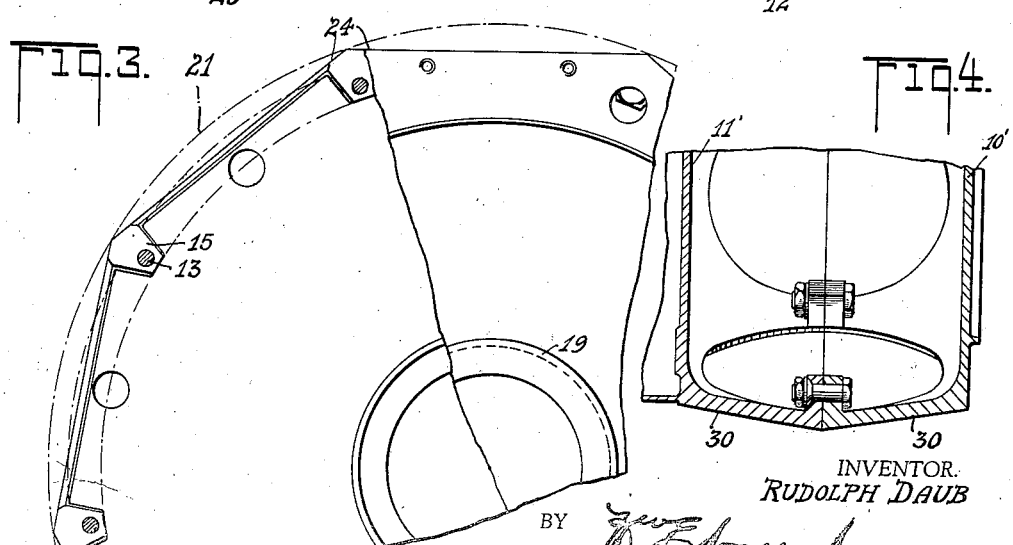
INVENTOR.
RUDOLPH DAUB
BY
ATTORNEY.

Patented Feb. 6, 1940

2,189,600

UNITED STATES PATENT OFFICE 2,189,600

CRANKCASE

Rudolph Daub, Paterson, N. J., assignor to Wright Aeronautical Corporation, a corporation of New York Application May 27, 1937, Serial No. 144,989

7 Claims. (Cl. 121—194)

This invention relates to crankcases adapted for use in radial internal combustion engines. Crankcases for radial cylinder engines are ordinarily of more or less drum form, the crankshaft being borne by bearing webs defining the ends of the crankcase, while the periphery of the crankcase is provided with a plurality of circular openings within which portions of the cylinders project, the cylinders being attached to flat decks formed on the crankcase exterior. Usually, such crankcases are made in halves which are bolted together on a plane intersecting the cylinder axes, and the crankcase halves are fabricated from aluminum alloy forgings or from steel. Due to the basic requirement of light weight in an aircraft engine, and also due to the requirement that all surfaces of the crankcase be capable of inspection for cracks, the parts are machined all over, the dimensions being held within rather close tolerances in order that all parts of the case are accurately dimensioned in accordance with stress requirements in the mechanism. The machining of these crankcase units can become very involved, and the tendency in the past, instead of being toward simplification of the structure, has been toward further complication thereof with a consequent increase in the fabricating cost due to the complex machining operations necessary.

It is an object of this invention to provide a radial cylinder crankcase of relatively simple design, particularly adapted for simple machining operations.

A further object is to delineate a method for crankcase fabrication in which most of the operations may be performed in a lathe, with a minimum of milling operations which have a tendency to cost more in their performance than lathe operations.

Still another object is to provide a design of crankcase in which the cylinder decks are formed by simple boring operations, and wherein, when the cylinder decks are formed, the thickness of crankcase material throughout the periphery of each cylinder deck is substantially uniform, such uniformity being obtainable by simple machining operations in cooperation with the basic crankcase form.

A further object is to provide a crankcase of annular form wherein the outer and inner peripheries thereof comprise concentric spherical surfaces.

Another object is to provide a radial cylinder crankcase which may be formed from relatively simple forging dies whose manufacturing cost may be much less than that of dies used in conventional types of crankcases.

A further object is to provide a type of crankcase which is particularly adapted, in its design, for fabrication from steel forgings.

Further objects will be apparent from a reading of the annexed specification, together with an examination of the drawing, in which similar numbers indicate similar or like parts, and in which:

Fig. 1 is a side elevation of an assembled crankcase according to the invention;

Fig. 2 is a longitudinal section through the crankcase;

Fig. 3 is an end elevation of one of the crankcase halves, part of which is shown from one end and part from the other end, and Fig. 4 is a partial longitudinal section through an alternative form of crankcase.

The crankcase of this invention comprises mating halves 10 and 11 being joined on the parting plane 12 by a plurality of bolts 13 engaging flanges 14 and 15 formed on the inside of the respective halves. The halves respectively comprise bearing diaphragms 16 and 17 having bearing bosses 18 and 19 for the reception of roller bearings (not shown) which carry a crankshaft (not shown). The periphery 20 of the crankcase is of spherical form as indicated by the dot-dash lines in Fig. 2 at 21. It is proposed that the rough forgings from which the halves 10 and 11 are fabricated may be either annular pieces having the flanges 14 and 15 coextensive with the circumference of the respective halves, and the periphery 20 of the crankcase assembly likewise circumferentially extensive, with no cylinder openings formed therein, or alternatively, the forgings may have the same essential contour as would obtain in an annular forging, but wherein the several cylinder openings are formed; the latter type of forging would reduce the amount of metal which would subsequently have to be removed, although the forging die cost for such an arrangement would be greater than that for the annular form of forging.

In the machining of the crankcase halves, the forging faces in the plane 12 will first be surfaced, and appropriate bolt holes for the bolts 13 will be formed, after which the crankcase halves 10 and 11 are bolted together. Now, both halves of the crankcase together may be finished inside and out by lathe turning operations, since all faces of the periphery 20, the diaphragms 16 and 17, the bearing bosses 18 and 19, and a housing extension 22 to provide a cam follower mounting, are of essentially annular form. The interior and exterior faces of the periphery 20 may be swept into spherical form by a suitable lathe set-up. Flats 23 around the projection 22, to provide decks for cam follower attachment, may be formed by a cam grinding or milling operation where the assembly is held on centers as in a lathe. Thus, it will be seen that all essential surfaces of the crankcase assembly are formed by simple turning operations without recourse to complex milling operations. The flanges 14 and 15 will initially be of annular form so that they, too, lend themselves to the turning operation.

After the drum-like form of the crankcase has been attained to finished dimensions, the case may be set up on an indexing turret in a boring machine, and crankcase decks 24 may be faced thereon. Since the decks are plane surfaces cut from a spherical element, a face boring operation will result in the periphery 25 of the decks 24 being of circular form, and likewise, where such facing operation goes through the periphery 20, the inner periphery of the deck 24 will likewise be circular. By a suitably formed facing tool, the openings 26 may be cut cleanly to the desired diameter, with a thickness, at the edge of the deck 24, as indicated at 27, appropriate to sustain the cylinder loads imposed upon the deck through conventional cylinder hold-down studs.

By virtue of the geometrical arrangement, wherein the plane deck 24 intersects the originally spherical contour of the crankcase periphery 20, the web thickness of the deck will be constant throughout its circumference at any radius of the deck, so that, when the crankcase hold-down stud holes 28 are drilled around the several decks 24, the thickness of material will be consistent throughout the deck circumference, giving favorable and equal strength characteristics for all of the hold-down studs. This construction also lends itself to the proposition that all of the holes 28 may be drilled clear through the crankcase periphery 20, eliminating blind holes into thick crankcase sections with consequent difficulties of drilling and tapping. It is apparent that the full thickness of the periphery is reduced gradually along a radius of each deck 24, so that the deck thickness is less than that of the periphery 20. So long as the deck is thick enough to provide adequate thread length in the stud holes, the crankcase is efficient from the strength-weight aspect, since the reduced thickness and stiffness of the decks is augmented upon engine asembly by the cylinder hold-down flanges which seat upon the decks. The stiffness of the cylinder flanges and cylinder decks together is in proper balance with the stiffness of the peripherial parts of the crankcase between cylinders, which latter comprise, in effect, cantilever beams tapered from the diaphragm support to the parting plane of the crankcase halves to subscribe to the form of a cantilever beam permitting minimum deflection. Likewise, the stress transmission between the cylinder decks and the cylinder flanges is efficient, for a surplus of material is eliminated at the extreme inner border of each cylinder opening.

When the crankcase forgings are formed as annular members, the boring operation by which the decks 24 and the openings 26 are formed, will likewise remove the unnecessary portions of material of the flanges 14 and 15. Where the forgings are formed with the rough cylinder openings, naturally the flanges 14 and 15 will not be circumferentially coextensive with the crankcase, and it will only be necessary to dress the end faces of the several flanges 14 and 15 in the same operation by which the cylinder bores 26 are finished.

A number of holes 29 are formed in the projection 22 to accommodate cam followers which are fastened to the cam follower decks 23, these holes 29 being formed by a suitable drilling or boring operations wherein the crankcase unit is held on an indexing fixture.

Fig. 4 shows an alternative section for a crankcase of the character disclosed wherein the peripheries of the two halves 10' and 11' are formed as truncated cones 30 and 31. The same sequence of machining operations would be desirable in the alternative embodiment, and the straight tapered faces which comprise the crankcase periphery would be formable upon a conventional lathe without the necessity for a sperical turning set-up as would be necessary for the first described embodiment. However, the spherical crankcase periphery, as above described, provides for equal web thickness throughout the circumference of each deck 24, whereas in the form of invention shown in Fig. 4 there would be slight divergence in web thickness throughout the circumference of the several decks. It would merely be a matter of expedience in balancing the advantages derived from the simpler machining operation involved in the embodiment of Fig. 4 against the equal web thickness advantage flowing from the embodiment of Figs. 1, 2 and 3.

The form of crankcase herein disclosed is particularly adapted for manufacture from steel forgings, although it might likewise be used in connection with other materials. Since the machining of non-ferrous components is somewhat more easily accomplished than the machining of steel, this construction lends itself favorably to steel construction, due to the simple machining operations involved. The various milling and forming operations required in prior art crankcases, while requiring a great number of machining set-ups, were fairly readily accomplished on non-ferrous materials, and the natural tendency, when the superior strength of steel was needed for higher power engines, was to adapt the prior aluminum alloy construction to steel, but the cost of such a steel case is excessive, due to the much greater time needed for accomplishing the numerous machining operations inducted as a result of not working from basic conceptions as to reasonably priced machine operations for steel.

Those steel crankcases adapted from aluminum alloy machine practice are, of course, of much greater strength than the aluminum alloy crankcases, and not only their cost, but their weight, tends to be excessive. By utilizing the teachings of this invention, a steel crankcase may be fabricated whose weight is approximately only five percent greater than the weight of an aluminum alloy crankcase for a similar engine, but the strength of the steel case is very much greater, and its cost of production compares favorably with the cost of production of the aluminum alloy article.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a radial cylinder engine crankcase, forward and rearward crankcase sections each comprising an annular bearing diaphragm having integral cylinder deck forming projections extending from the diaphragm periphery, each said projection having an inturned flange at its end most remote from the diaphragm, said sections being adapted for assembly with the flanges of one section abutting the flanges of the other section, and bolts engaging respective abutting flanges of the sections, each cylinder deck formed exteriorly of said projections meeting the edge of an adjacent deck at its extreme edge.

2. In a radial cylinder engine, a crankcase comprising axially spaced annular diaphragms, circumferentially spaced projections extending toward one another from respective diaphragms into abutting relation at the plane common to the cylinder axes, said projections having inwardly extending flanges, and bolts securing the flanges of respective crankcase sections, the exterior faces of said projections being formed as plane cylinder decks each meeting an adjacent deck at its edge.

3. In a radial cylinder engine, a crankcase comprising forward and rearward sections including annular diaphragms and internally and externally spherically formed portions integral with respective diaphragms and joining the latter, said portions abutting one another substantially half way between the planes of said diaphragms, said portions having plane, circular, adjacent, cylinder decks around the periphery thereof each lying within the confines of the spherical envelope thereof.

4. In a radial cylinder engine, a crankcase comprising forward and rearward sections including annular diaphragms and internally and externally spherically formed portions integral with respective diaphragms extended toward one another, said portions abutting one another substantially half way between the planes of said diaphragms, said portions having plane, circular, cylinder decks around the periphery thereof each deck lying within the confines of the spherical envelope thereof, the circular borders thereof lying adjacent neighboring decks, and joints for said sections comprising inwardly disposed flanges on the inner ends of the portions of one section abutting corresponding inwardly disposed flanges on the inner ends of the portions of the other section, and bolts securing said flanges.

5. A radial cylinder engine crankcase section comprising an annular bearing diaphragm, circumferentially spaced integral projections extending from one side of the diaphragm edge, forming cylinder deck members terminating at the axial plane of the cylinders, and an integral ring-like member extending from the other side of the diaphragm edge to provide a mounting for other parts of the engine, said projections including inwardly turned flanges at their ends remote from the diaphragm for securement to another crankcase section.

6. A two-section crankcase for a radial cylinder engine comprising an annular wall on each section, an inturned flange on each section wall, the flanges being in abutting relation, means to secure the flanges together inboard of the wall profile, and integral annular bearing diaphragms extending inwardly from said walls at points axially spaced from said flanges, said walls together having circumferentially spaced cylinder openings interrupting the annular continuity of said flanges.

7. A two-section crankcase for a radial cylinder engine comprising an annular wall on each section, an inturned flange on each section wall, the flanges being in abutting relation, means to secure the flanges together inboard of the wall profile, and integral annular bearing diaphragms extending inwardly from said walls at points axially spaced from said flanges, said walls together having circumferentially spaced cylinder openings interrupting the annular continuity of said flanges, said walls being profiled to substantially spherical form and having circular plane cylinder decks within the spherical form and bordering the cylinder openings, the circular outline of each deck being tangent to the circular outlines of neighboring decks.

RUDOLPH DAUB.